US004001586B2

United States Statutory Invention Registration [19]

[11] Reg. Number: H1586

[45] Published: Sep. 3, 1996

Fellows et al.

[54] METHODS OF AND SYSTEMS FOR ENCODING AND DECODING A BEAM OF LIGHT UTILIZING NONLINEAR ORGANIC SIGNAL PROCESSORS

[75] Inventors: William G. Fellows, Laurel; Lester Weinberger, Silver Spring, both of Md.

[73] Assignee: The United States of America as represented by the Secretary of the Army, Washington, D.C.

[21] Appl. No.: 471,980

[22] Filed: Jan. 30, 1990

[51] Int. Cl.[6] ..... G02B 5/00

[52] U.S. Cl. ..... 252/582; 252/587; 252/589

[58] Field of Search ..... 252/582, 587, 252/589; 350/326, 328, 329, 331, 278, 287; 359/285, 305, 312, 328; 385/122

[56] References Cited

U.S. PATENT DOCUMENTS

| | | | |
|---|---|---|---|
| 4,012,699 | 3/1977 | Gibbs et al. | 252/582 |
| 4,139,277 | 2/1979 | Berg et al. | 359/285 |
| 4,859,876 | 8/1989 | Dirk et al. | 252/582 |
| 4,882,402 | 11/1989 | Leslie et al. | 252/582 |
| 4,882,715 | 11/1989 | Egara et al. | 367/140 |
| 4,913,836 | 4/1990 | East | 252/582 |
| 4,944,896 | 7/1990 | DeMartino et al. | 252/582 |
| 4,985,179 | 1/1991 | Seo et al. | 252/582 |
| 5,016,958 | 11/1991 | Booth | 350/328 |
| 5,121,249 | 6/1992 | Fellows | 359/323 |
| 5,150,242 | 9/1992 | Fellows | 252/582 |

OTHER PUBLICATIONS

Kurmer, J., Schwerzel, R., "Organic Materials for Integrated Optical Waveguides," Photonics Spectra, pp. 121–126 Jun. 1989.

Allen, S. "Materials with a Bent for Light", New Scientist, pp. 59–63 Jul. 1, 1989.

Garito, A., Singer, K., "Organic Crystals and Polymers–A New Class of Nonlinear Optical Materials." Laser Focus, pp. 59–64 Feb. 1982.

*Primary Examiner*—Charles T. Jordan
*Assistant Examiner*—John R. Hardee
*Attorney, Agent, or Firm*—Freda L. Krosnick; Frank J. Dynda; Muzio B. Roberto

[57] ABSTRACT

An audio optical processor unit employing a nonlinear organic optical element which may be in the form of a nonlinear polymer, a nonlinear organic material or a mixture of liquid crystal materials or polymers. The nonlinear organic optical element is interfaced by a piezo-electric crystal which encodes a laser beam passing through the optical element by inducing changes in the index of refraction or the changes in voltage potential across the polymer or non-linear organic material. The resulting encoded output is detected in a conventional manner by a photodetector array.

6 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHODS OF AND SYSTEMS FOR ENCODING AND DECODING A BEAM OF LIGHT UTILIZING NONLINEAR ORGANIC SIGNAL PROCESSORS

BACKGROUND OF THE INVENTION

1. Field of the Invention

The instant invention relates to audio optical signal processors and decoders, and more particularly, the instant invention relates to such processors and decoders which rely on electro-optic, piezo-electric crystal technology in combination with nonlinear crystals and the like utilized in signal-information processing techniques and audio and speech processing techniques.

2. Prior Art

Audio and digital decoders and translators; encryption devices, and real time audio translation and printed output and graphic devices generally rely on nonlinear inorganic crystals such as lithium niobate to modulate and demodulate optical signals. The chemical and physical differences between nonlinear inorganic crystals and nonlinear organic crystals are legion. While there are literally millions of noncentrosymmetric organic compounds which have nonlinear optical properties, there are only a few inorganic compounds having such properties. To date, inorganic crystals have been relied on in most electro-optical applications due to the relative simplicity of the crystalline configuration thereof wherein the crystals rely on ionic attraction to form molecules from associated atoms. Organic molecules, however, are held together by covalent forces and share valence electrons among atomic centers thereof. This results in compounds such as polymers which are easier to fabricate, shape and engineer into particular geometric designs than are inorganic compounds which are difficult and expensive to fabricate and synthesize since they are generally created by growing appropriate crystalline structures.

To date, reliance on inorganic crystals for electro-optical applications limits new development and flexibility of optical signal processing technology.

SUMMARY OF THE INVENTION

A method of encoding a beam of light comprises the steps of passing the light through an optical body of nonlinear organic material while controlling the molecular orientation of the material to produce an encoded or decoded optical output.

The nonlinear organic material may be one of a number of polymers, organic dyes, mixtures of liquid crystal materials or other organic materials.

In accordance with a preferred embodiment, the molecular orientation of the material is controlled by a piezo-electric crystal which interfaces directly with the nonlinear organic element or body.

The instant invention further comprises an optical system for encoding a monochromatic beam of light wherein the system includes an optical body of nonlinear organic material and a device for controlling the molecular orientation of the material to encode the beam of light. The nonlinear organic material may be a polymer selected from a wide range of polymers, other organic materials or a mixture of liquid crystal materials.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
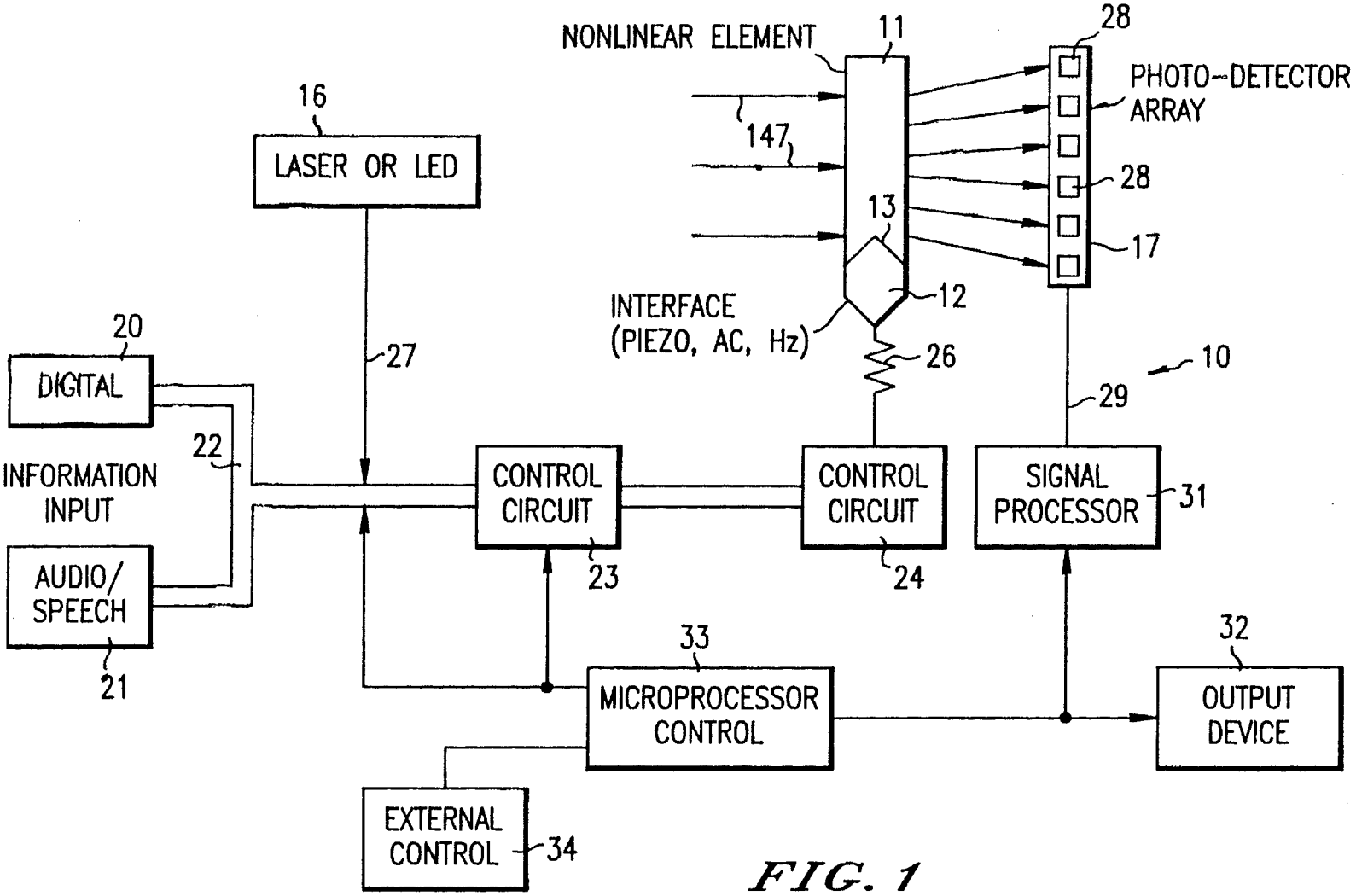
FIG. 1 is a diagrammatical view illustrating a system utilizing a nonlinear element in an audio-optical signal processor and decoder.

Referring now to FIG. 1, there is shown an overall system diagram for an optical signal processor and decoder, designated generally by the numeral 10, and configured in accordance with the principles of the instant invention. The controller 10 utilizes a nonlinear processing element 11 which is controlled by a piezo-electrical crystal 12 that abuts the nonlinear processing element along an interface 13 to provide a crystal interface which relies on the piezo-electric properties of quartz or similar materials. The nonlinear processing element 11 is controlled by changes in the piezo-electric interface 13 of the crystal 12 with the nonlinear element.

The quartz crystal/piezo-electrical effect utilizes its resonant frequency properties to control the molecular orientation within the nonlinear crystal 11 so as to in effect tune the molecular orientations thereof, either through piezo-electric potential changes or crystal resonant frequencies. Monochromatic light 14 from a laser or LED 16 is modulated by the nonlinear element 11 prior to detection by a photodetector ray 17.

Considering the system generally, the piezo-electric crystal 12 and the laser or LED 16 are controlled by the circuit comprised of informational inputs in the form of a digital interface or keyboard 20 and an audio/speech interface or microphone 21 which are connected by a signal/databus 22 to electronic interface circuitry 23. The electronic interface circuitry 23 is applied through a signal control and conditioner circuit 24 to the piezo-electric crystal 12 to tune the molecular orientations within the nonlinear element 11 via an interface coupling 26. The laser or LED 16 is connected via line 27 to the bus 22 so as to be controlled by the digital interface or keyboard 20.

The photodetector array 17, which may include a series of photodiodes 28, is connected by an output 29 to a signal processor 31 which is preferably in the form of a digital signal processor chip. The output of the signal processor 31 is applied to the output device 32 which may, for example, be a printer or display. Microprocessor control 33 controls the operation of the system via outputs to the signal/databus 22 and the electronic interface circuits 23 and has a facility 34 for external or manual inputs or commands. With the exception of the nonlinear optical element 11 and the associated piezo-electric interface 13 activated by the piezo-electric crystal 12, the aforedescribed system is comprised of known components.

Figure 2:
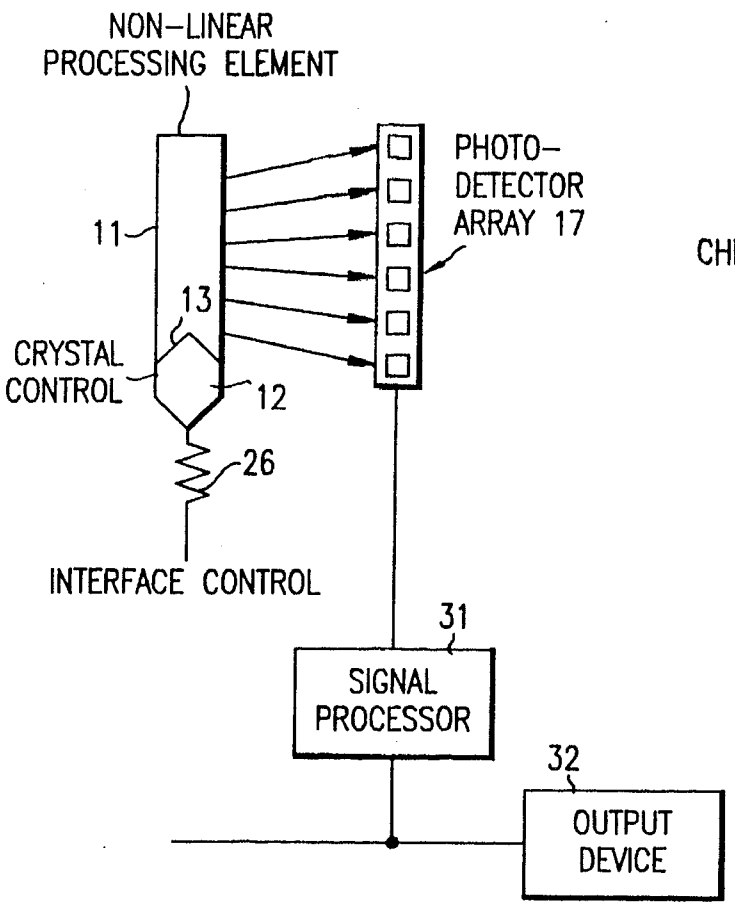
FIG. 2 is a diagrammatical view illustrating a crystal control interface and nonlinear processing element coupled to produce information outputs and encodings.

Referring now to FIG. 2, the crystal control interface 13 and nonlinear processing element 11 of nonlinear optical materials is shown connected optically to the photodetector array 17 to produce information outputs and encodings for enhancing speed and signal/information processing for numerous applications such as speech synthesis and translation, encryption and decoding, and direct output interfacing in real time to various computational printers' graphic devices and audio devices.

The following nonlinear optical materials are exemplary of the materials utilized in the nonlinear optical element 11 of FIG. 2:

1. Cyanine dyes;
2. 2-methyl-4-nitroaniline (MNA);
3. Indanthrones;
4. Stilbenes;
5. Pyridine N-oxides;
6. 2-(p-dimethylaminophenyl)-6-(p-nitrophenyl)-benzo(1,2-d:4,5-d')bis-thiazole (DNBT);
7. 2-(4-(dimethyl-amino)phenyl)-5-nitrobenzoxazole.

Figure 3:
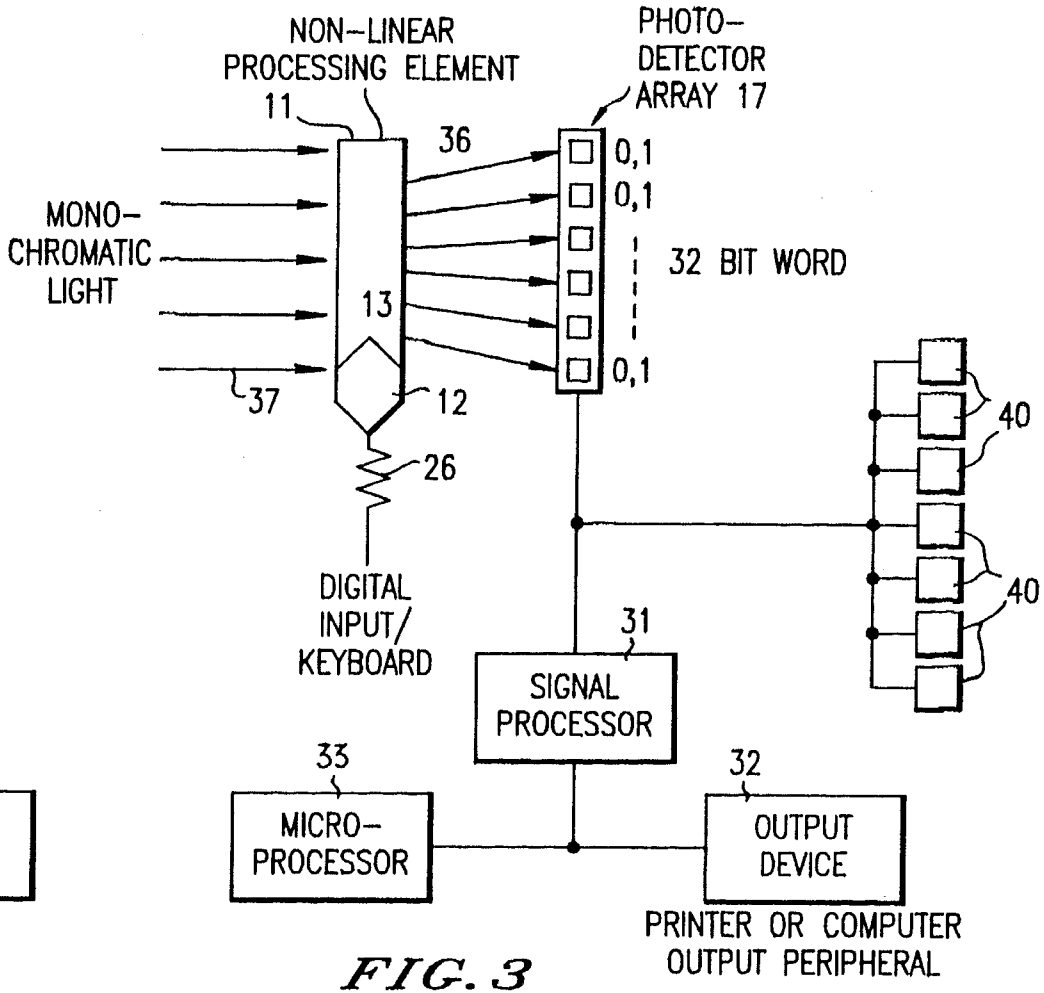
FIG. 3 is a diagrammatical view illustrating a nonlinear processing element linked to a series of parallel processors.

In FIG. 3, there is shown an optical crystal processor for processing digital signal inputs to produce digital outputs 36 from monochromatic light 37 which is processed by the nonlinear processing element 11 which is controlled by the piezo-electric crystal 12 through the interface 13. The piezo-electric crystal 12 transmits a digital, keyboard input through the nonlinear processing element 11 to modulate the monochromatic light 37 so as to produce the encoded light 36. The photodetector array 17 responds to a digital word format, such as a 32-bit word format, and provides a 32-bit digital output through either signal processor 31 or to a series of parallel processors 40 to perform parallel processing functions.

Figure 4:
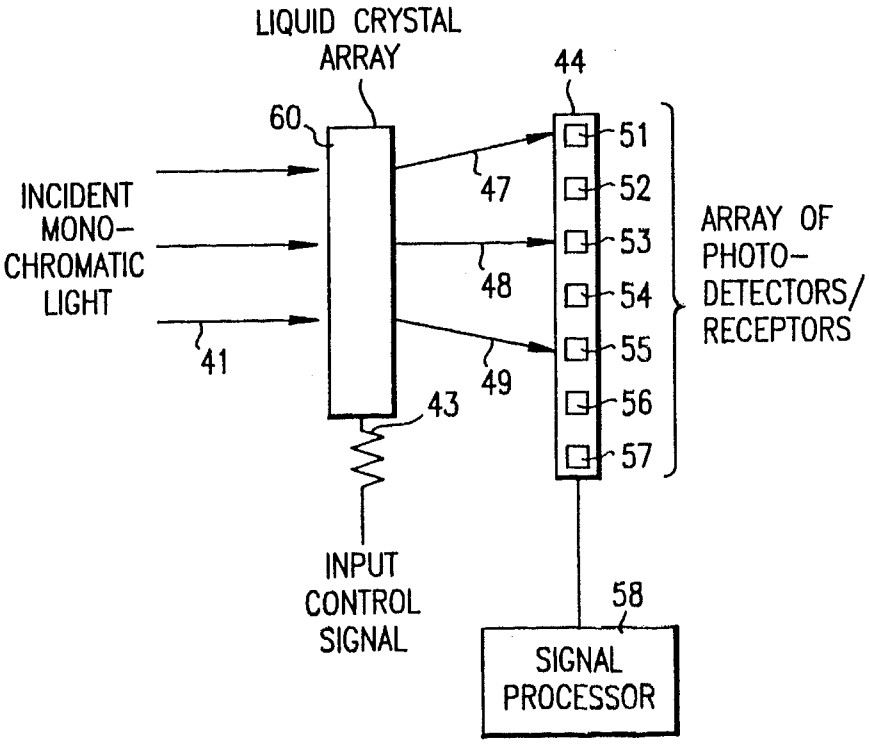
FIG. 4 is a diagrammatical view illustrating an optical signal decoder and processor utilizing a liquid crystal display as an input control interface.

Referring now to FIG. 4, an incident monochromatic light beam 41 from a laser is applied through a nonlinear processing element wherein the nonlinear processing element is in the form of a liquid crystal array 42. The liquid crystal array 42 may be controlled via an input control interface 43 supplied by a connection with a piezo-electric crystal, and a source of alternating current or an applied resonant frequency. The input control interface 43 changes the orientation of the liquid crystals in the array 42 to allow or encode light at different polarizations to be transmitted to the photodetection array 44, thereby receiving and sampling for analysis the incoming beam 41 of transmitted laser light. With this arrangement, different packets of digital information represented by lines 47, 48 and 49 are diverted to different locations represented by areas 51–57 on the photodetector array 44. A signal processor 58 analyzes the location of the detector areas 51–57 which have received the different information packets 47–49 and a signal processing operation correlates the information with an associated database or sequence, thus decoding the information received.

Generally liquid crystal materials are mixtures of numerous materials. Exemplary of such mixtures and materials which may be used to comprise the liquid crystal array 42 are disclosed in U.S. Pat. Nos. 4,621,901; 4,662,283; 4,670,182 and U.S. Pat. No. 4,707,296, all incorporated herein by reference.

Figure 5:
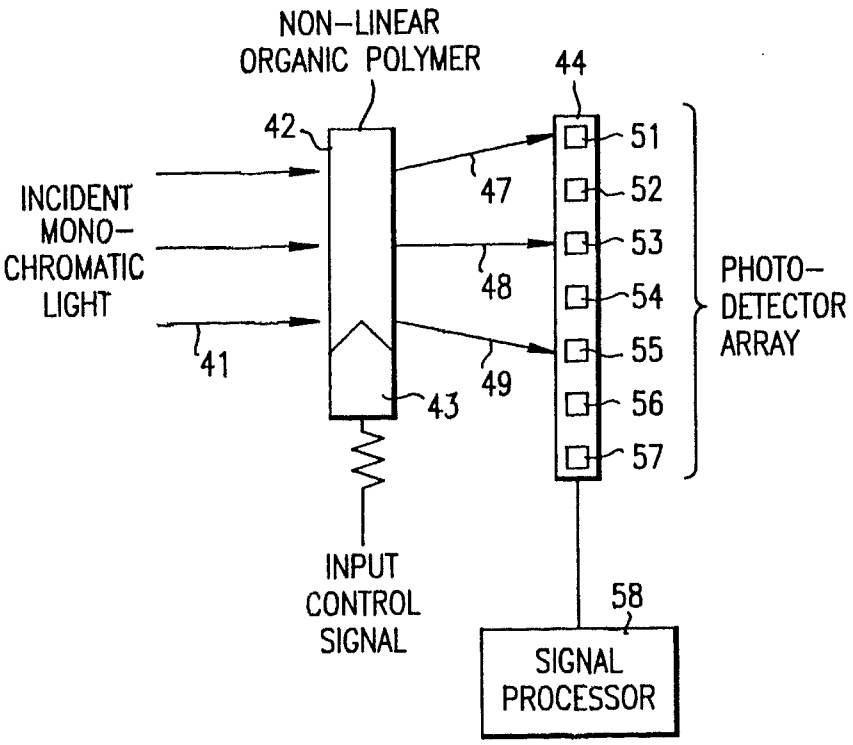
FIG. 5 is a diagrammatical view illustrating an optical signal decoder and processor using a nonlinear organic polymer as an input control interface.
Figure 6:
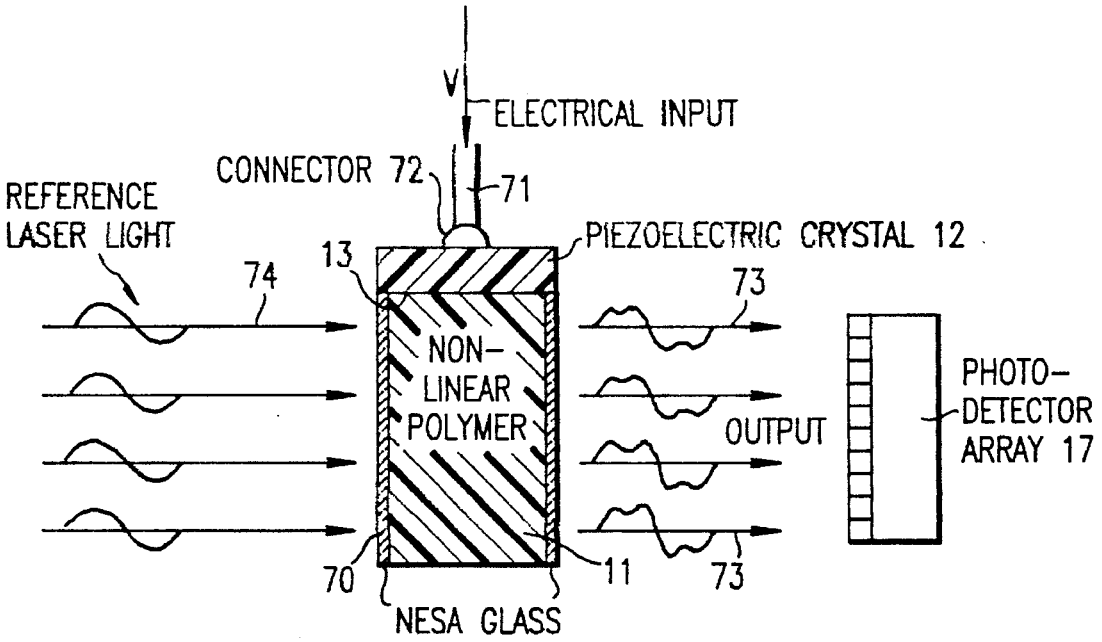
FIG. 6 is a schematic view showing the basic concept of an optical acoustic processor encoding information on a reference laser beam.

Referring now to FIG. 5, the various elements are the same as FIG. 4; however, the nonlinear element is in the form of a nonlinear organic polymer 60 which has variations in refraction indices induced by phonon interactions. These variations control the incident monochromatic light 41 to produce the encoded or decoded light packets 47, 48 and 49, which are applied to the various areas 51–57 of the photodetector array 44.

Examples of organic polymer materials which are fabricated into nonlinear processing elements 60 according to the invention are:

1. 4,4'-oxynitrobiphenyl methacrylates;
2. N-oxypyridyl cyanophenoxy methacrylates;
3. Poly(p-phenylenebenzo[1,2-d:4,5-d']bisthiazole (PBT);
4. Emeraldine salt forms of polyaniline;
5. Polyacetylenes;
6. Dye substituted polyethers.

The light sources 16 and 41 of FIGS. 1–5 are preferably either standard dye lasers or neodymium YAG lasers. Preferably, the interface 13 of the nonlinear optical elements 11, 42 and 60 with the piezo-electric crystals 12 and 43 have a film thickness in the range of about 1 to 5 microns and a channel length in the range of about 10 to 50 microns and preferably about 25 microns. The photodetectors or photoreceptors of FIGS. 1–5 are of conventional photosensitive materials, such as germanium, indium, gallium arsenide, lead selenide, lead sulfide and mercury cadmium telluride.

Referring now to FIGS. 6, 7, 8 and 9 where four configurations of the audio optical processor element 11 (FIG. 1) is shown in greater detail in combination with the piezo-electric crystal 13 and photodetector array 17. The basic design shown in FIG. 6 of the audio processor unit interfaces the piezo-electric crystal 12 with the nonlinear polymer or material 11 across an interface 13. The nonlinear polymer or material 11 is contained in a cell 70 comprised of a conductive NESA glass enclosure. The electrical input over line 71 through the connector 72 induces proportional stresses in the piezo-electric crystal 12 which is directly interfaced with the nonlinear organic polymer or material 11, thus inducing proportional changes in the index of refraction of the material. These proportional changes control or direct the output diffraction 73 of the reference laser light 74 (14 in FIG. 1). The output is then detected by the photodetector array 17 and transmitted to the signal processor 12 of the system 10 (see FIG. 1).

Figure 7:
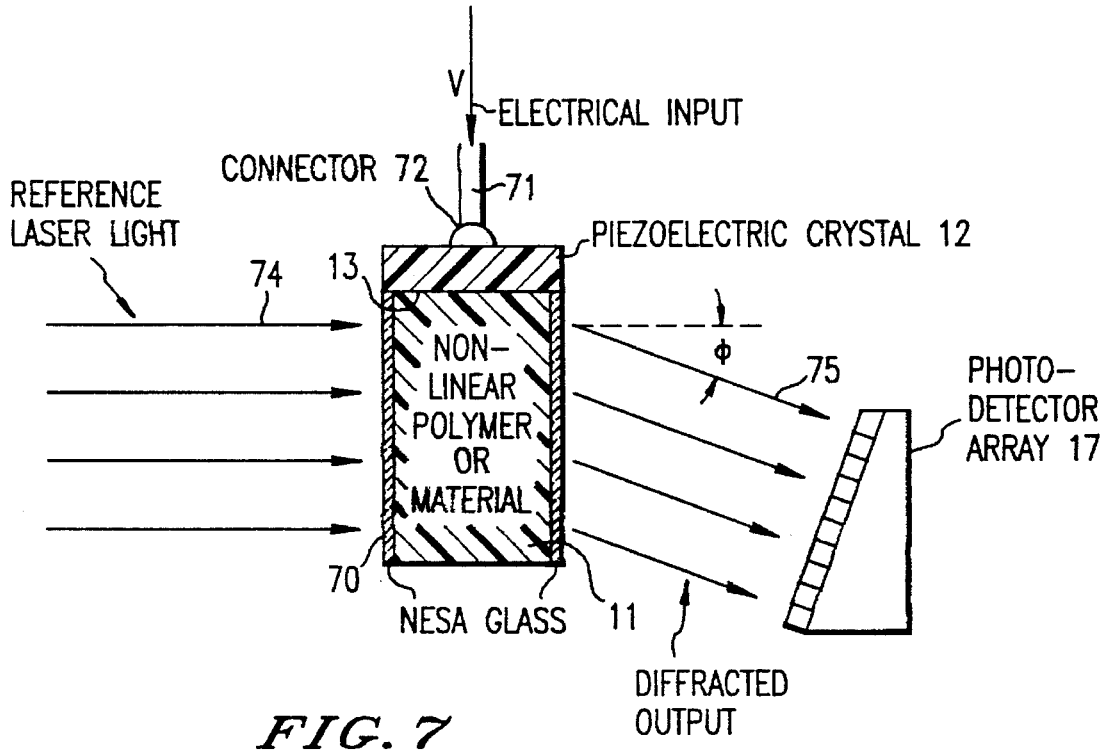
FIG. 7 is a schematic view showing an audio optical processor producing controlled diffraction of a reference beam through changes in the index of refraction in a nonlinear organic polymer or material.

Referring now to FIG. 7, the audio optical process produces a designated or controlled diffraction of the reference beam 74 through controlled or induced changes in the index of refraction in the nonlinear organic polymer or material 11 and thus the diffracted output 75 is offset by an angle ø with respect to the input beam 74 of laser light. The photodetector array 17 is oriented so that the diffracted output beam 75 strikes the photodetectors orthogonally.

Figure 8:
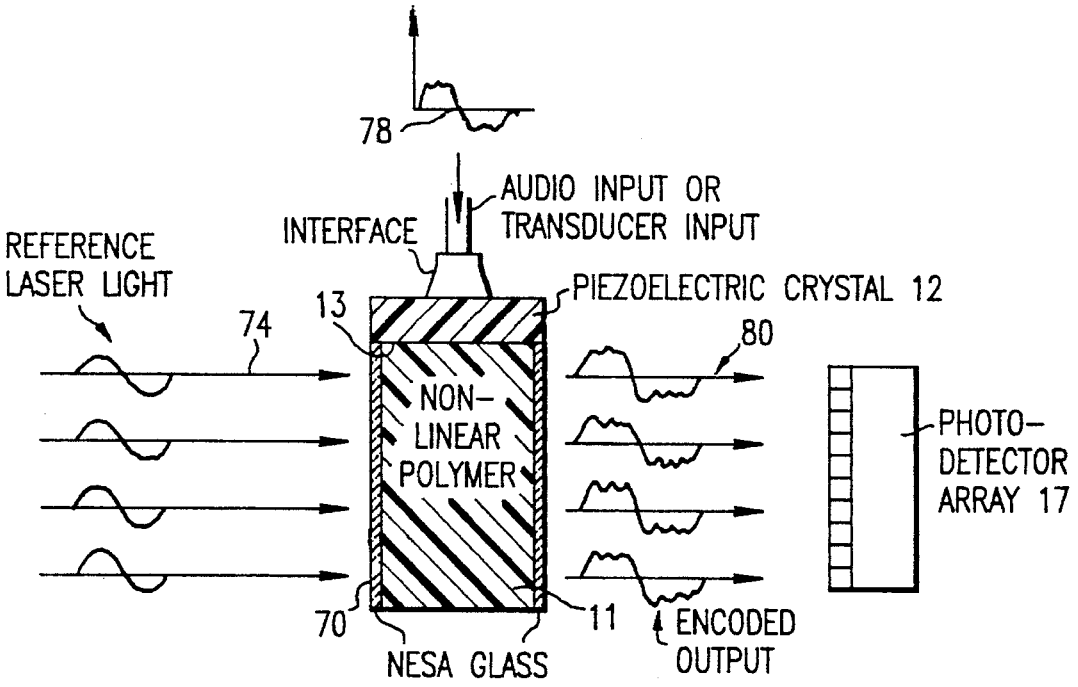
FIG. 8 is a schematic view showing an audio optical processor using audio inputs to induce changes in voltage potential across a nonlinear polymer or material.

Referring now to FIG. 8, a signal 78 from an audio transducer output such as a microphone is applied to the piezo-electric crystal 12 so as to induce changes in the nonlinear polymer or material 11 which are proportional to changes in the voltage potential across the polymer. This results in an encoded beam output 80 which impinges on the photodetector array 17.

Figure 9:
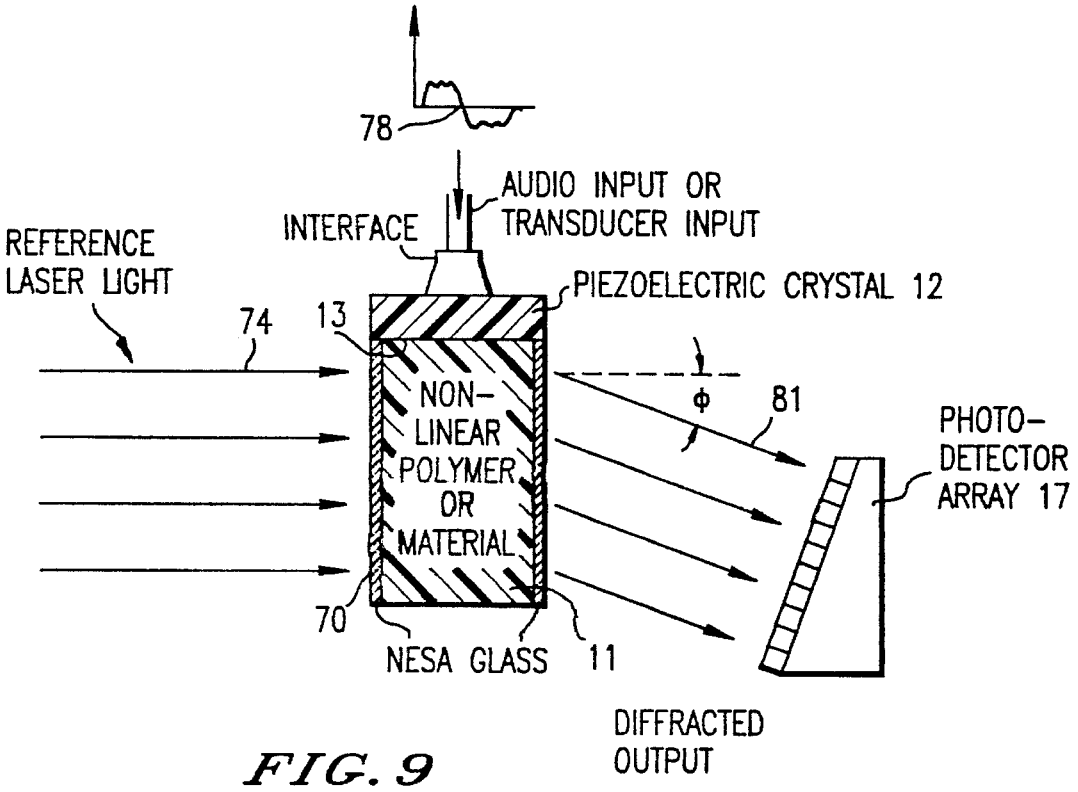
FIG. 9 is a schematic view showing an audio optical processor utilizing audio inputs to control diffracted outputs.

Referring now to FIG. 9, an arrangement similar to FIG. 8 is shown wherein audio inputs 78 are utilized to control or produce diffracted outputs 81 wherein the outputs 81 are at an angle ø with respect to the inputs 74. The photodetector array 17 is oriented so that the diffracted output 81 impinges orthogonally with respect to the plane of the photodetector array.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A method of encoding a beam of light comprising the steps of passing coherent, monochromatic light through an optical body of nonlinear organic material while controlling the diffraction of said light so as to produce an encoded or decoded optical output.

2. The method of claim 1, wherein the nonlinear organic material is a material selected from the group consisting of:

Cyanine dyes;

2-methyl-4-nitroaniline (MNA);

Indanchrones;

Stilbenes;

Pyridine N-oxides;

2-(p-dimethylaminophenyl)-6-(p-nitrophenyl)-benzo(1, 2-d:4,5-d')bis-thiazole (DNBT);

2-(4-(dimethyl-amino)phenyl)-5-nitrobenzoxazole.

3. The method of claim 1, wherein the diffraction of said light is caused by periodic changes in the refractive index of said nonlinear organic material which result from the transmission of acoustic waves generated by a piezo-electric crystal.

4. A method of encoding a beam of light comprising the steps of passing coherent, monochromatic light through an optical body of nonlinear organic material while controlling the diffraction of said light so as to produce an encoded or decoded optical output, wherein the diffraction of said light is caused by periodic changes in the refractive index of said nonlinear organic material which result from the transmission of acoustic waves generated by a piezo-electric crystal, and the piezo-electric crystal interfaces directly with the nonlinear body.

5. The method of claim 4, wherein the beam of light is modulated by an audio input applied through the nonlinear organic material via the piezo-electric crystal.

6. The process of claim 5, wherein the piezo-electric crystal is controlled by a digital input control signal.

* * * * *